United States Patent
Espinosa

[11] Patent Number: 5,947,664
[45] Date of Patent: Sep. 7, 1999

[54] STOP DEVICE FOR USE WITH MILLING MACHINES

[76] Inventor: Gil Espinosa, 1526 Industrial Park St., Covina, Calif. 91722

[21] Appl. No.: 08/929,582

[22] Filed: Sep. 15, 1997

[51] Int. Cl.$^6$ ........................................................ B23C 1/12
[52] U.S. Cl. ...................... 409/218; 408/241 S; 409/210; 409/214
[58] Field of Search ...................... 82/153, 154; 408/137, 408/202, 241 S; 409/184, 210, 214, 218

[56] References Cited

U.S. PATENT DOCUMENTS

| | | | |
|---|---|---|---|
| 3,037,404 | 6/1962 | Burg | 408/241 S |
| 3,604,668 | 9/1971 | Bernhardt | 248/223 |
| 3,724,963 | 4/1973 | Stadtmiller | 408/14 |
| 4,014,621 | 3/1977 | Johnson et al. | 408/16 |
| 4,048,897 | 9/1977 | Price, Jr. | 85/33 |
| 4,787,794 | 11/1988 | Guthrie | 411/433 |
| 5,036,596 | 8/1991 | Gyoury et al. | 409/218 |
| 5,106,242 | 4/1992 | Obrecht et al. | 408/241 S |
| 5,286,147 | 2/1994 | Escobedo et al. | 409/218 |
| 5,486,177 | 1/1996 | Mumme et al. | 408/241 S |

Primary Examiner—William Briggs
Assistant Examiner—Christopher Kirkman
Attorney, Agent, or Firm—James E. Brunton

[57] ABSTRACT

A stop device that can be readily interconnected with a variety of commercially available vertical milling machines to precisely control the vertical travel of the quill mechanism of the milling machine. The bolt-on stop device of the invention includes three vertically adjustable stop mechanisms, each of which includes adjustable slide elements that can be horizontally extended or retracted relative to the quill mehanism of the milling machine. When extended the slide element moves directly into the path of vertical travel of a follower member, or depth indicator, provided on the quill mechanism of the machine. When retracted, the slide will clear the follower member of the quill mechanism so as to enable its engagement with the next adjacent stop or slide element of the device.

15 Claims, 4 Drawing Sheets

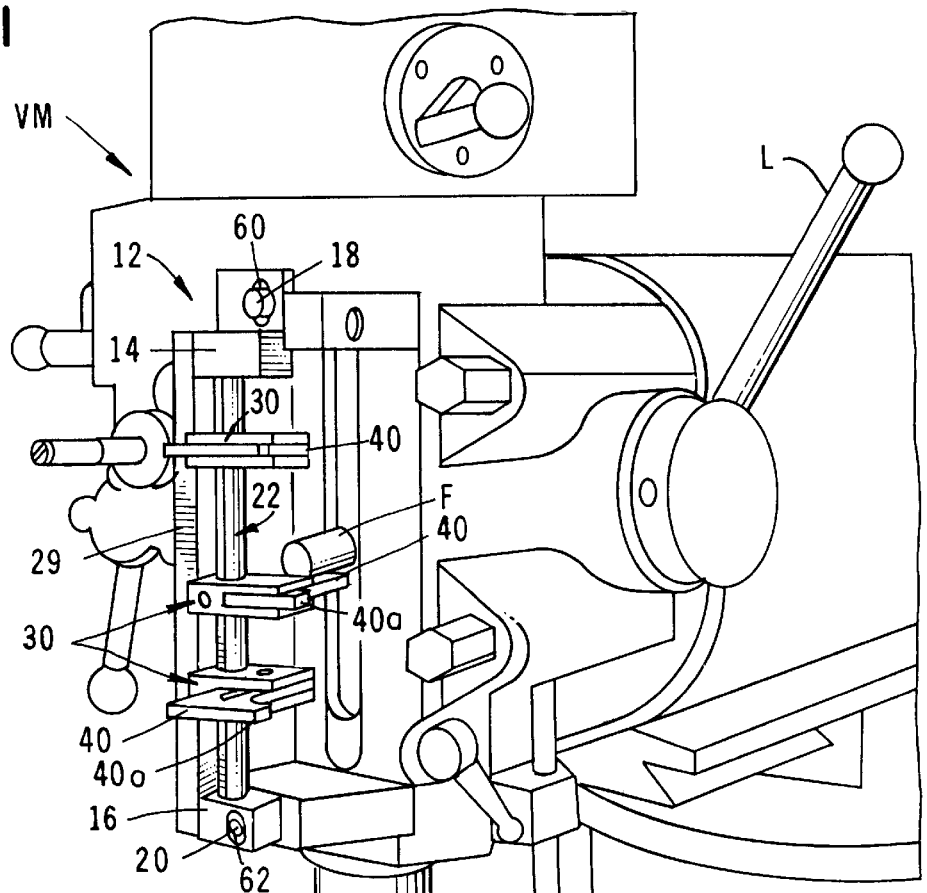
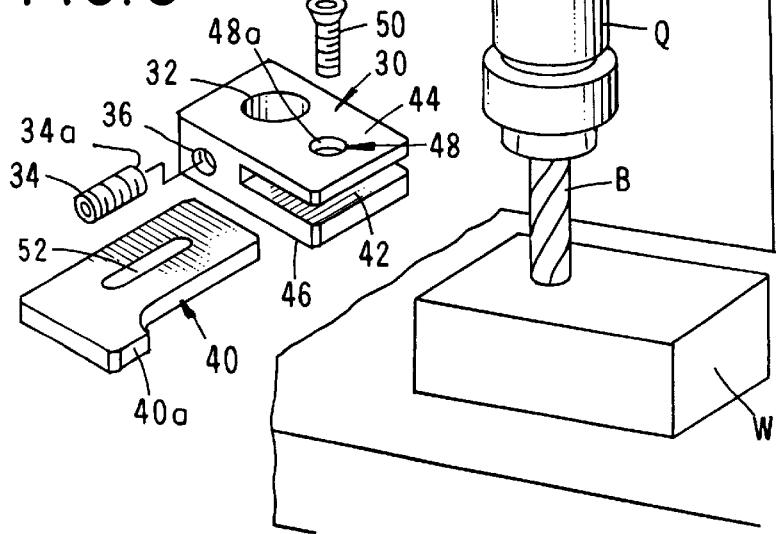

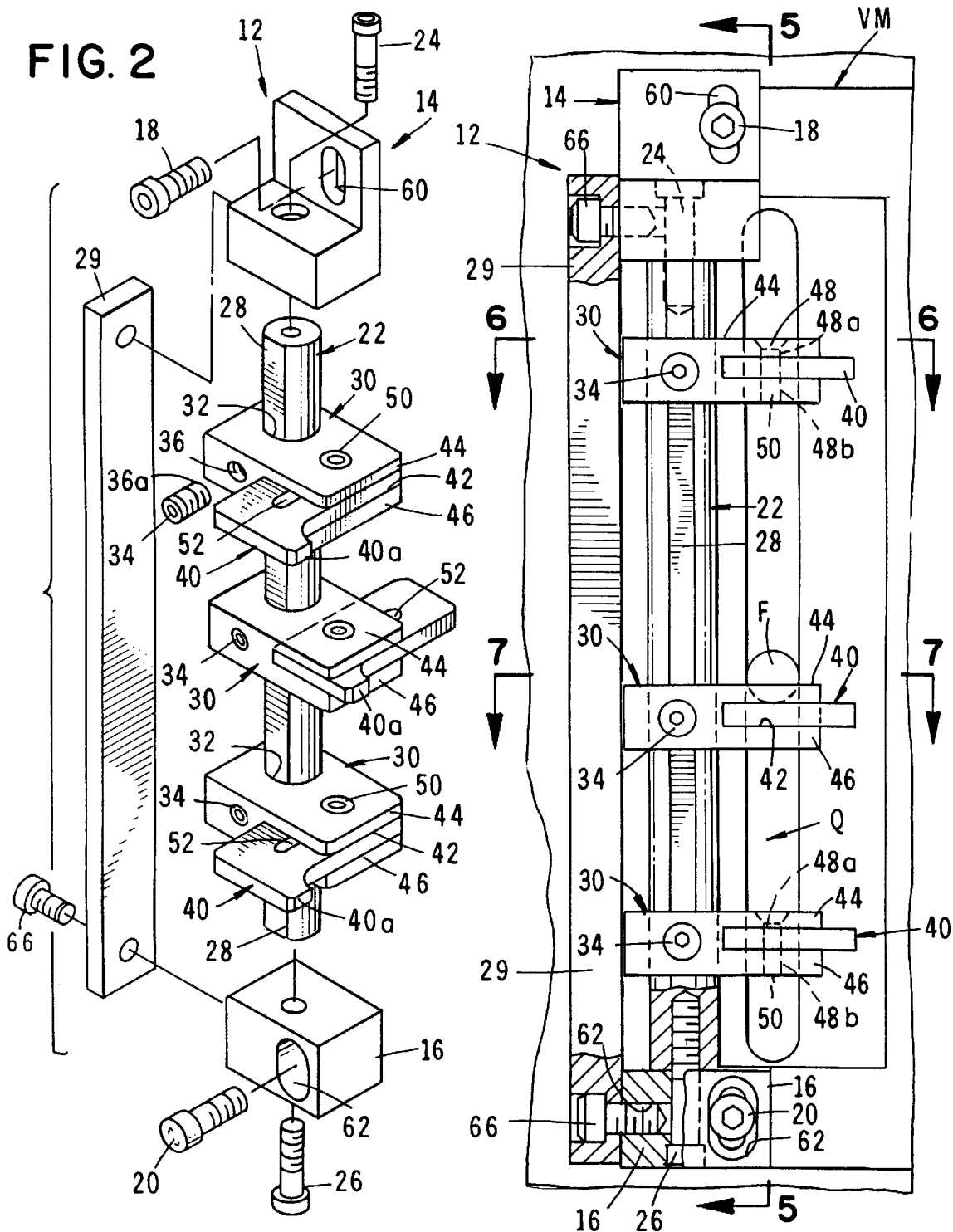

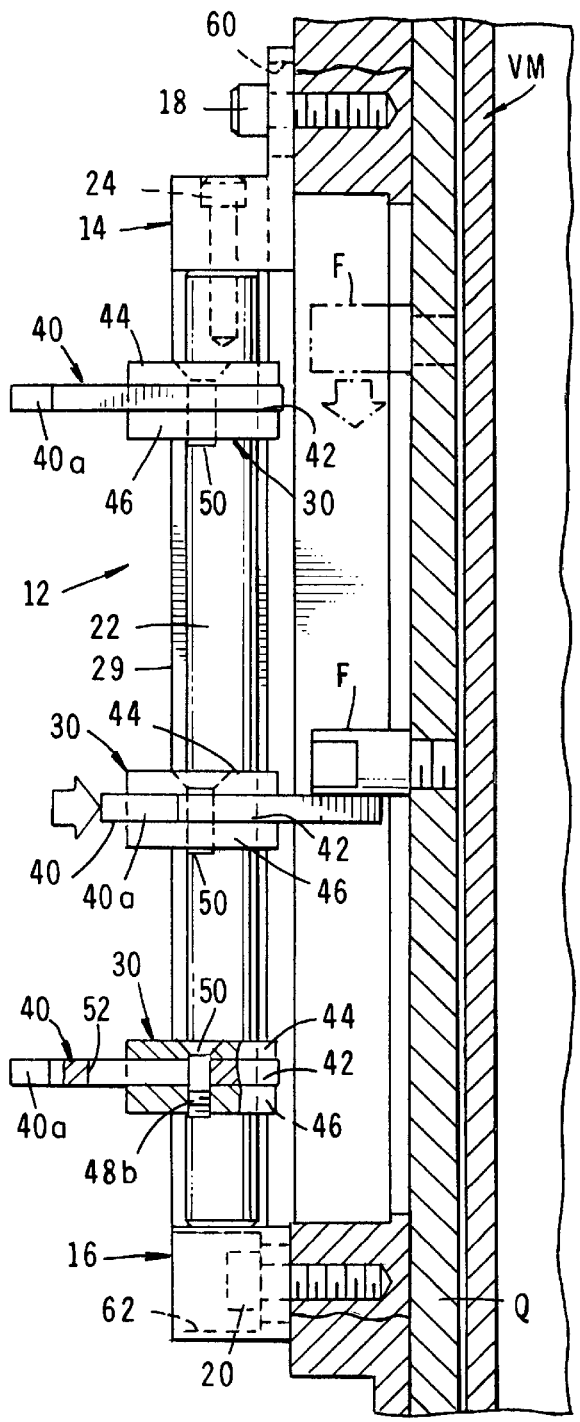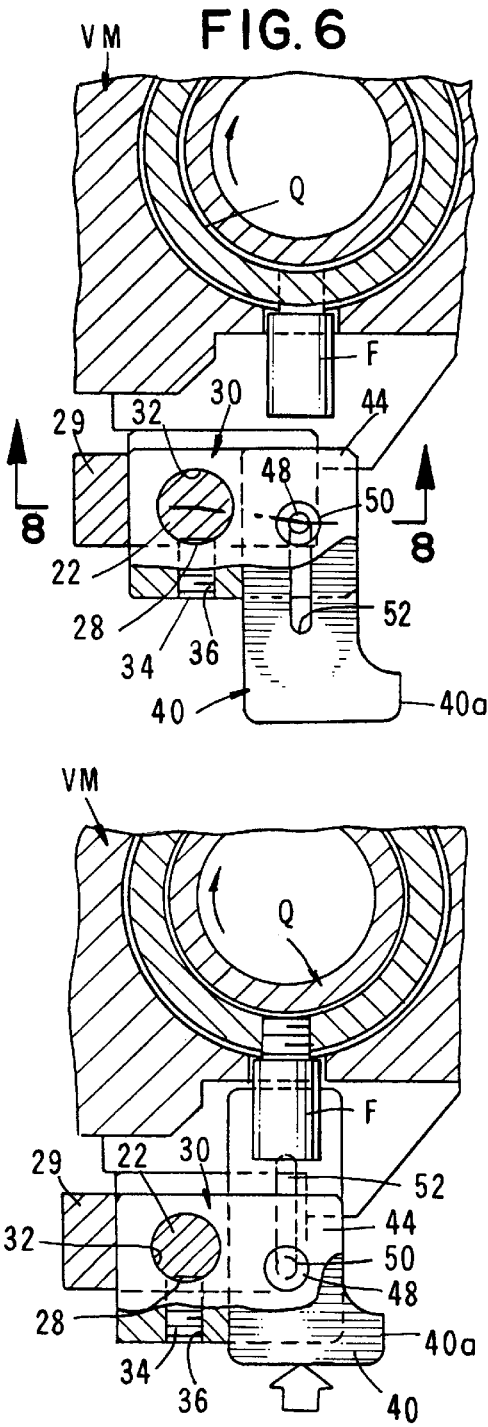
FIG.5 FIG.6 FIG.7

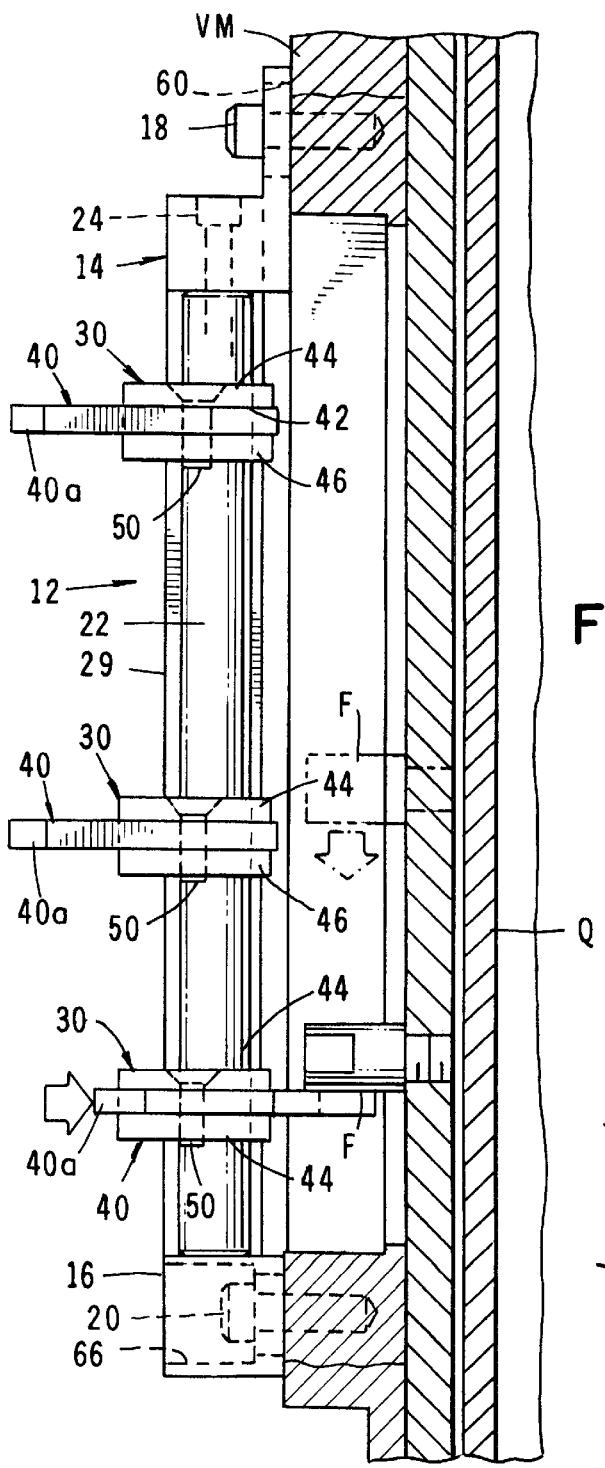
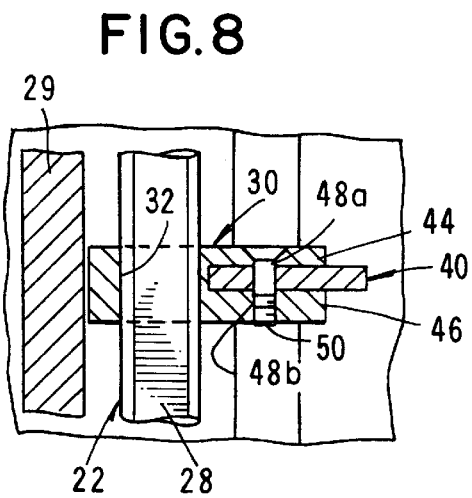
FIG. 8
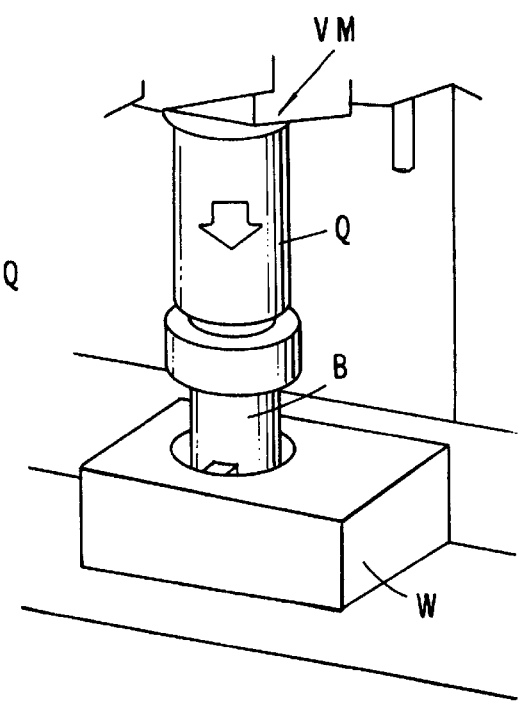
FIG. 9
FIG. 10

STOP DEVICE FOR USE WITH MILLING MACHINES

BACKGROUND OF THE INVENTION

1. Field of the Invention

The present invention relates generally to attachments for machine tools. More particularly, the invention concerns a stop device for use in connection with vertical milling machines to control vertical travel of the quill mechanism of the machine.

2. Discussion of the Invention

Vertical milling machines are of course old in the art and a number of different types of milling machines are readily commercially available. These commercially available milling machines may be generally classified into two main divisions, horizontal and vertical. In horizontal milling machines the milling cutter is carried on a horizontal arbor (spindle), while in the vertical type milling machine the arbor is vertically disposed.

Typically vertical milling machines are built up from a massive casting, Usually a rectangular box section forming an upright column which supports a vertical spindle that carries a rotating multi-toothed cutter. The upright column also supports an adjustable, power-driven, horizontal table which supports the work and controllably feeds it relative to the rotating spindle in a direction generally perpendicular to the axis of the spindle. Vertical milling machines are typically used for facing and boring and are sometimes provided with a rotary table for making cylindrical surfaces.

The rotating spindle of the vertical mill is typically carried by a quill which is controllably moveable in a vertical direction relative to the supporting column by a hand feed lever. Movement of the hand feed lever moves the quill and the cutting tool vertically relative to the work piece and to the work piece supporting table. Many commercially available vertical milling machines are provided with an automatic stop which can be used to control vertical travel of the quill of the machine. As will be better understood from the discussion which follows, the stop device of the present invention comprises a bolt-on, hard-stop unit that can be used in connection with most commercially available vertical milling machines without removing the existing automatic stop mechanism. More particularly, the device of the present invention includes mounting means for mounting the device on the vertical milling machine at a location approximate the quill mechanism of the machine. A guide shaft, which is disposed between and connected to the mounting means, supports a plurality of adjustable stops which can be used to precisely control vertical movement of the quill assembly of the vertical milling machine. Each of the adjustable stops is slidably movable relative to the guide shaft of the device and can be quickly and easily positioned by the operator to precisely control manually the extent of vertical travel of the quill mechanism of the milling machine.

SUMMARY OF THE INVENTION

It is the object of the present invention to provide a simple, easy-to-use, manual hard stop device which can be readily interconnected with a variety of commercially available vertical milling machines to precisely control the vertical travel of the quill mechanism of the milling machine.

Another object of the invention is to provide a manual hard stop device of the aforementioned character which comprises a bolt-on, hard-stop unit that can be removably affixed to the vertical milling machine without the necessity of removing existing automatic stop mechanisms that may be provided with the machine.

Another object of the invention is to provide a manual hard a stop device of the type described in the preceding paragraphs which includes a minimum of three vertically adjustable, stop mechanisms. Each stop mechanism includes a slide element that can be horizontally extended or retracted relative to the quill mechanism of the milling machine. When extended the slide element moves directly into the path of vertical travel of a follower member, or depth indicator, provided on the quill mechanism of the machine. When retracted, the slide will clear the follower member of the quill mechanism so as to enable its engagement with the next adjacent stop or slide element of the device.

Another object of the invention is to provide a manual hard stop device for use with vertical milling machines which is of simple construction, but one which is extremely accurate and durable in use.

Another object of the invention is to provide a stop device of the character described which requires little maintenance and one that can be used by any qualified machinist with a minimum amount of instruction.

BRIEF DESCRIPTION OF THE DRAWINGS

FIG. 1 is a generally perspective view of a vertical milling machine upon which one form of the mill stop device of the present invention has been mounted.

FIG. 2 is a generally perspective, exploded view of the form of multi-stop device illustrated in FIG. 1.

FIG. 3 is a generally perspective exploded view of one of the stop elements of the multi-stop device of the invention.

FIG. 4 is a side-elevational view partly in cross section of one form of the assembled multi-stop device shown in FIG. 3.

FIG. 5 is a cross-sectional view taken along lines 5—5 of FIG. 4.

FIG. 6 is a cross-sectional view taken along lines 6—6 of FIG. 4.

FIG. 7 is a cross-sectional view taken along lines 7—7 of FIG. 4.

FIG. 8 is a cross sectional view taken along lines 8—8 of FIG. 6. FIG. 9 is a cross-sectional view similar to FIG. 5 but illustrating the retraction of the center slide element of multi-stop device of the invention.

FIG. 10 is a generally perspective, fragmentary view illustrating the downward movement of the arbor of the vertical milling machine relative to the work piece.

DESCRIPTION OF ONE FORM OF THE INVENTION

Referring to the drawings and particularly to FIGS. 1 and 2, one form of the manual hard stop device of the present invention for use with milling machines to control vertical travel of the quill mechanism of the machine is there shown and generally designated by the numeral 12. The device comprises first and second mounting means for mounting the device on a vertical milling machine "VM" of the general character shown in FIG. 1. As shown in FIG. 1 the mounting means functions to mount the device on the vertical milling machine at a location approximate the quill mechanism "Q" of the machine. In the form of the invention shown in the drawings, the mounting means comprises first and second mounting blocks 14 and 16 which are connected to the milling machine by upper and lower threaded connectors 18 and 20 respectively. The method of connecting the mounting blocks to the milling machine will be described in the paragraphs which follow.

Referring particularly to FIGS. 2 and 3 the stop device of the invention can be seen to comprise an elongated vertically mounted guide shaft 22 which extends between blocks 14 and 16 and which is connected thereto by threaded connectors 24 and 26. Formed on one side of guide shaft 22 is an elongated flat 28, the purpose of which will presently be described. Also interconnecting blocks 14 and 16 is a rigid side bar 29.

Slidably mounted on guide shaft 22 are a plurality of quill stop means which function to engage a follower member "F" provided on the quill "Q" of the quill mechanism of the vertical drill press. As seen in FIG. 3, each of the quill stop means comprises a body portion 30 which is provided with a vertical bore 32 for closely receiving guide shaft 22. Body 30 is also provided with connector means for releasably connecting the body portion to guide shaft 22. This connector means here comprises a threaded connector 34 which is threadedly received within a horizontally disposed, internally threaded bore 36 provided in body portion 30. Upon clockwise rotation, the inboard end 34*a* of connector 34 is movable into secure locking engagement with the flat 28 provide on guide shaft 22, (see also FIG. 7). With this construction each of the stop mechanisms can be selectively positioned at a desired location along guide shaft 22 by first loosening threaded connector 34, by then sliding the stop mechanism either up or down relative to guide shaft 22 and then by finally re-tightening threaded connector 34 in a manner to secure the guide means at the desired vertical location along guide shaft 22.

As best seen in FIGS. 2 and 3, each of the stop means of the invention also includes a slide element 40 which is slidably received within a slot 42 provided in body portion 30. Slot 42 is defined by spaced apart upper and lower wall portions 44 and 46 respectively (FIG. 3). A threaded bore 48 extends through wall portions 44 and 46 and is adapted to threadably receive a threaded connector 50. Each slide element 40 is provided with an elongated, centrally disposed slot 52 which is located such that when the slide element 40 is assembled with body 30, connector 50 will extend through upper portion 48*a* of threaded bore 48, through slot 52 provided in slide element 40 and then into lower portion 48*b* of threaded bore 48 (FIG. 4). With this construction, tightening of threaded connector 50 will cause the space between body portions 44 and 46 to decrease slightly so as to provide a snug fit between the slide element and the inner surfaces of walls 44 and 46. Ideally this fit is such that, while the slide member can be easily moved from a retracted position shown in the upper portion of FIG. 2 to an extended position shown in the central portion of FIG. 2, it will nevertheless tend to remain in this position until manually retracted by the operator gripping the finger engaging protuberance 40*a* provided on each of the slide members 40.

In installing the stop device of the present invention on the milling machine "VM", the assembled device is positioned as parallel as possible to quill "Q" of the milling machines in the manner shown in FIGS. 1 and 5. The location of bores 60 and 62 provided in blocks 12 and 16 are then marked on the face of the milling machine and two small ¼-20 drilled holes are formed in the face of the milling machine. Preferably the drill holes are ½ inch in depth and are tapped to form internal threads adapted to receive connectors 18 and 20 . However, it is to be understood that the size of the holes to be drilled and tapped depend upon the size of threaded connectors 18 and 20 which are used to secure blocks 14 and 16 to the milling machine. As best seen in FIG. 2 the vertically extending sideplate 29 is connected to blocks 14 and 16 by suitable connectors, such as connectors 66 , provide rigidity to the assembly after it is interconnected with the milling machine.

With the device affixed to the vertical milling machine in the manner shown in FIGS. 1 and 4, each of the stop means can be positioned at a desired location along guide shaft 22 by loosening and then re-tightening the respective threaded connectors 34 of the stop means. With the stop means thus in position, a selected one of the slide elements 40 can be moved into the extended position as, for example, the slide element shown in FIG. 1 which is located approximate the central portion of shaft 22. With the slide element 40 in its extended position, downward movement of the quill of the machine caused by downward movement of hand-held lever "L" (FIG. 1) will cause follower "F" to engage the slide element thereby blocking any further downward movement of the quill and the cutting bit "B" relative to the work piece "W".

After drilling to the depth permitted by the positioning of the centrally disposed stop means, slide element 40 can be retracted and, if desired, a different cutting tool can be interconnected with the spindle of the machine. By way of example, in a situation wherein a counter bore is to be made in the work piece "W", a larger diameter cutting tool will replace cutting bit "B" and then using the finger engaging protuberance 40*a*, the slide element 40 provided on the lower most stop means of the stop device can be moved from the retracted position shown in FIGS. 1 and 5 to the extended position shown in FIG. 9. With the slide element in this extended position and with the slide element of the upper stop means retracted, as shown in FIG. 9, movement of the hand-held lever "L" will cause the quill to travel a further downward vertical distance until follower "F" engages the slide element 40 of the lower most stop means wherein further vertical will be precluded.

After the counterboring operation is completed, slide element 40 of the lower stop means can be retracted and the quill moved to its upper, at rest position. If it is desired to bore a more shallow hole in the work piece, the slide element 40 of the upper most stop means can be moved from the retracted position shown in FIGS. 4 and 6 to an extended position and the boring step repeated to cause follower "F" to engage this upper most extended slide element.

It is apparent that by proper positioning and manipulation of the stop means of the invention, the extent of vertical travel of the quill of the milling machine can be precisely controlled. It is to be understood that while only three stop means are shown slidably mounted to guide shaft 22, any number of such means can be slidably interconnected with the guide shaft and operated in the manner described in the preceding paragraphs.

Having now described the invention in detail in accordance with the requirements of the patent statutes those skilled in this art will have no difficulty in making changes and modifications in the individual parts or their relative assembly in order to meet specific requirements or conditions. Such changes and modifications may be made with out departing from the scope and spirit of the invention as set forth in the following claims.

I claim:

1. A stop device for use with milling machines to control vertical travel of the quill mechanism of the machine, said device comprising:

(a) first and second mounting means for mounting the device on the vertical milling machine at a location proximate the quill mechanism of the machine;

(b) a guide shaft disposed between and connected to said first and second mounting means;

(c) at least one quill stop means slidably connected to said guide shaft for engagement with said quill mechanism to control vertical movement thereof, said quill stop means comprising:

(i) a body portion having a vertical bore there-through for receiving said guide shaft and a guideway spaced apart from said vertical bore;

(ii) connector means for releasably connecting said body portion to said guide shaft; and (iii) a spindle engaging slide member slidably mounted within said guideway for sliding movement between a first retracted position and a second extended position.

2. A device as defined in claim 1 in which said first and second mounting means comprises first and second vertically spaced apart mounting blocks.

3. A device as defined in claim 2 in which said guide shaft has an axial center line, first and second ends, said first mounting block being connected to said guide shaft proximate said first end thereof and said second mounting block being connected to said guide shaft proximate said second end thereof.

4. A device as defined in claim 3 including a plurality of quill stop means slidably connected to said guide shaft.

5. A device as defined in claim 3 in which said body portion of said quill stop means has a first threaded bore extending substantially perpendicularly to said axial center line of said guide shaft.

6. A device as defined in claim 5 in which said connector means comprises a threaded connector having a guide shaft engaging extremity, said threaded connector being threadably received with said threaded bore of said body portion whereby said guide shaft engaging extremity can be moved into and out of engagement with said guide shaft.

7. A device as defined in claim 6 in which said body portion of said quill stop means includes first and second spaced apart walls which define said guideway, each of said walls having a guide pin receiving bore provided therethrough.

8. A device as defined in claim 7 in which said slide member has a slot provided therein and in which said quill stop means further includes slide member guide means for guiding travel of said slide member within said guideway, said slide member guide means comprising a guide pin extending through said guide pin receiving bores provided in said first and second spaced apart walls of said body portion and also extending through said guide pin receiving slot provided in said slide member.

9. A device as defined in claim 8 in which said slide member includes finger engaging means for moving said slide between said first retracted position and said second extended position.

10. A device as defined in claim 8 in which said guide pin comprises a threaded guide member and in which said guide receiving bores provided in said first and second spaced apart walls include threads for threadably receiving said threaded guide member, whereby the spacing between said first and second spaced apart walls can be varied.

11. A stop device for use with milling machines to control vertical travel of the quill mechanism of the machine, said device comprising:

(a) first and second mounting means for mounting the device on the vertical milling machine at a location proximate the quill mechanism of the machine, said mounting means comprising first and second mounting blocks connected to the vertical milling machine;

(b) a guide shaft disposed between and connected to said first and second mounting blocks;

(c) a plurality of quill stop means slidably connected to said guide shaft for engagement with said quill mechanism to control vertical movement thereof, each said quill stop means comprising:

(i) a body portion having a vertical bore there-through for receiving said guide shaft and a guideway spaced apart from said vertical bore;

(ii) connector means for releasably connecting said body portion to said guide shaft; and (iii) a generally planar shaped quill mechanism engaging slide member slidably mounted within said guideway for sliding movement between a first retracted position and a second extended position.

12. A device as defined in claim 11 in which said body portion of each said quill stop means includes first and second spaced apart walls which define said guideway.

13. A device as defined in claim 12 in which said slide member has a slot provided therein and in which said quill stop means further includes slide member guide means for guiding travel of said slide member within said guideway.

14. A device as defined in claim 13 in which said slide member guide means comprises a guide pin extending through said guideway and also through said slot provided in said slide member.

15. A device as defined in claim 14 in which said guide pin comprises a threaded guide member and in which each of said first and second spaced apart walls of said body portion are provided with threaded bores for threadably receiving said threaded guide member, whereby the spacing between said first and second spaced apart walls can be varied.

* * * * *